United States Patent [19]

Wan et al.

[11] Patent Number: 4,727,052

[45] Date of Patent: Feb. 23, 1988

[54] CATALYST COMPOSITIONS AND METHODS OF MAKING THE SAME

[75] Inventors: Chung-Zong Wan, Somerset; Joseph C. Dettling, Howell, both of N.J.

[73] Assignee: Engelhard Corporation, Menlo Park, N.J.

[21] Appl. No.: 879,684

[22] Filed: Jun. 27, 1986

[51] Int. Cl.$^4$ .......................................... B01J 21/04
[52] U.S. Cl. ................................. 502/327; 502/304; 502/328; 502/332; 502/333; 502/334; 502/339; 502/341; 502/351; 502/355; 502/439; 502/527
[58] Field of Search ............... 502/304, 327, 332–334, 502/355, 439, 527, 328, 339, 341, 351

[56] References Cited

U.S. PATENT DOCUMENTS

| | | | |
|---|---|---|---|
| 3,554,929 | 1/1971 | Aarons | 502/304 |
| 3,993,572 | 11/1976 | Hindin et al. | 502/304 |
| 4,294,726 | 10/1981 | Bozon et al. | 502/304 |
| 4,367,162 | 1/1983 | Fujitani et al. | 502/304 |
| 4,407,735 | 10/1983 | Sawamura | 302/304 |
| 4,438,219 | 3/1984 | Brandenburg et al. | 502/333 |
| 4,442,024 | 4/1984 | Crone, Jr. | 502/334 |
| 4,492,770 | 1/1985 | Blanchard et al. | 502/327 |
| 4,504,598 | 3/1985 | Ono et al. | 423/213.5 |
| 4,619,909 | 10/1986 | Ono et al. | 502/304 |

*Primary Examiner*—Curtis R. Davis
*Assistant Examiner*—Anthony McFarlane

[57] ABSTRACT

A method of making a catalyst composition comprising an activated alumina coating stabilized against thermal degradation includes applying a coating of alumina having one or more platinum group metal catalytic components dispersed thereon onto a carrier substrate and calcining the coating. The calcined coating is then impregnated with a solution of a thermal stabilizer-precursor and calcined again to provide a thermal stabilizer in the alumina. Bulk ceria, optionally an aluminum-stabilized bulk ceria, may also be added to the composition, preferably at specified minimum levels, including a high purity bulk ceria on which one or more non-rhodium platinum group metal catalytic components, e.g., platinum, optionally, are dispersed. A separate aspect of the invention provides for a method of making a catalyst composition including dispersing one or more platinum group metal catalytic components on an activated alumina and calcining the combined alumina and platinum group metal catalytic components. The steps are carried out under limited acidification conditions whereby at least minimum dispersions of the platinum group metal catalytic components are attained. The invention also provides for catalyst compositions resulting from either or both the foregoing methods.

58 Claims, 1 Drawing Figure

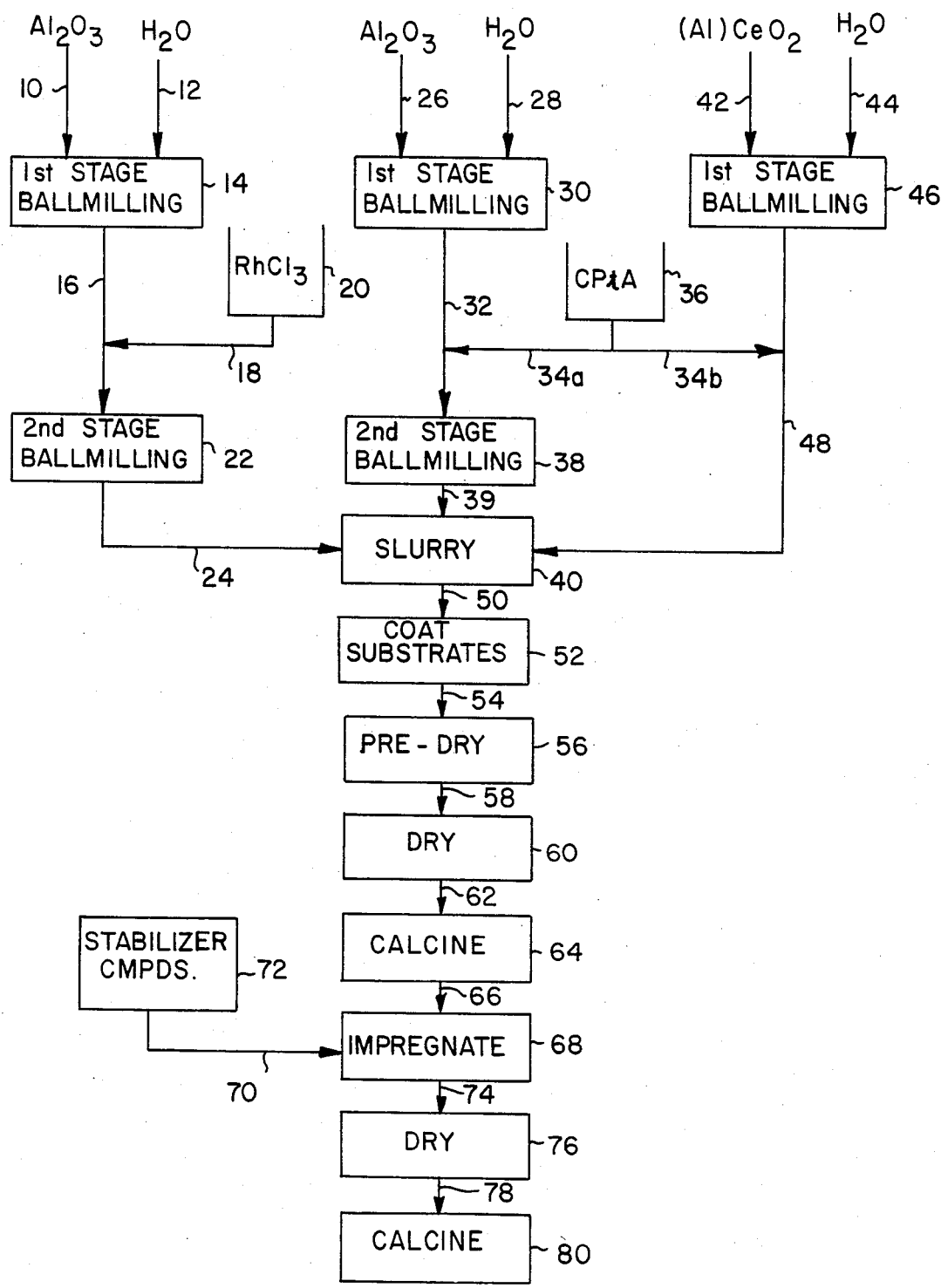

CATALYST COMPOSITIONS AND METHODS OF MAKING THE SAME

BACKGROUND OF THE INVENTION

1. Field of the Invention

The present invention is concerned with improvements in catalysts useful for the treatment of gases to reduce contaminants contained therein. More specifically, the present invention is concerned with improved catalysts of the type generally referred to as "three-way conversion" or "TWC" catalysts. These TWC catalysts are polyfunctional in that they have the capability of substantially simultaneously catalyzing the oxidation of hydrocarbons and carbon monoxide and the reduction of nitrogen oxides.

2. Background and Prior Art

Catalysts as described above find utility in a number of fields including the treatment of the exhaust from internal combustion engines, such as automobile and other gasoline-fueled engines. Emissions standards for unburned hydrocarbons, carbon monoxide and nitrogen oxides contaminants have been set by various governments and must be met, for example, by new automobiles. In order to meet such standards, so-called catalytic converters containing a TWC catalyst are emplaced in the exhaust gas line of internal combustion engines. The catalysts promote the oxidation by oxygen in the exhaust gas of the unburned hydrocarbons and carbon monoxide and the reduction of nitrogen oxides to nitrogen. If the engine operation is too rich in fuel to provide sufficient oxygen inherently in the exhaust gas, oxygen may be introduced into the exhaust gas as required. The use of separate catalyst beds to promote, respectively, oxidation and reduction, is known and it is also known to use a catalyst system combined in a single bed to substantially simultaneously promote both the oxidation and reduction reactions as described above. It is these types of polyfunctional catalyst systems that are generally referred to as TWC catalysts, as noted above. A great deal of activity has been engendered in the field in an attempt to economically produce catalysts which exhibit good activity and long life in promoting the conversion of hydrocarbons, carbon monoxide and nitrogen oxides, even when contained in very small quantities in a gas stream, to innocuous substances such as carbon dioxide, water and nitrogen. For this purpose, catalysts comprising one or more platinum group metals dispersed upon a high surface area support are well known in the art. The support may comprise a high surface area alumina coating carried on a carrier such as a monolithic carrier comprising a refractory ceramic honeycomb structure, as well known in the art.

Thus, typical catalyst compositions comprise a minor amount of platinum or palladium, preferably including one or more of rhodium, ruthenium and iridium, in particular rhodium, as a platinum group metal component. The platinum group metal component is typically dispersed on a high surface area alumina material which enhances the catalytic activity of the material by dispersing the catalytically active platinum group metal components on a very high surface area support layer. Typically loosely referred to in the art as "gamma alumina" or "activated alumina", such high surface area alumina materials typically exhibit a BET surface area in excess of 60 m$^2$/g, often in excess of 80 m$^2$/g, e.g., up to about 150 or 200 m$^2$/g or more. Such activated alumina is usually a mixture of the gamma and delta phases of alumina, but may also contain substantial amounts of eta, kappa and theta alumina phases.

A common deficiency associated with supported catalyst systems is thermal degradation of the catalyst support from extended exposure to high exhaust gas temperatures of the automotive or other internal combustion engine. In a moving vehicle for example, exhaust temperatures can reach 1000° C., and such elevated temperatures cause the support material to undergo a phase transition with accompanying volume shrinkage, especially in the presence of steam, whereby the catalytic metal becomes occluded in the shrunken support medium with a loss of exposed catalyst surface area and a corresponding decrease in activity. It is a know expedient in the art to stabilize the alumina against such thermal degradation by the use of materials such as zirconia, titania, alkaline earth metal oxides such as baria, calcia or strontia or, most usually, rare earth metal oxides, for example, ceria, lanthana and mixtures of two or more rare earth metal oxides. For example, see U.S. Pat. No. 4,171,288 of Carl D. Keith, et al.

Polyfunctional or three-way conversion catalysts, which serve to substantially simultaneously oxidize hydrocarbons and carbon monoxide and reduce nitrogen oxides, usually require that the ratio of air to fuel ("A/F ratio") introduced into the engine whose exhaust gas is being treated, be at or within a narrow deviation from the stoichiometric ratio. A problem with TWC systems is the adverse effect on catalyst activity caused by the use in automobiles of high A/F ratios which cause greater than stoichiometric oxygen concentration in the exhaust gases. To achieve optimal, substantially simultaneous redox reactions with conventional TWC systems requires the A/F ratio to be in the vicinity of stoichiometric. The use of high A/F ratios in automobile engines improves the fuel economy of the engine, but the presence of excess oxygen in the exhaust, referred to in the art as a "lean exhaust", reduces the activity of platinum group metal catalysts, as platinum is readily sintered at elevated temperatures in a lean exhaust atmosphere, thus reducing the available metal surface area of the catalyst. To achieve optimal simultaneous redox reactions in the exhaust using conventional catalysts, the A/F ratio must be in the vicinity of the stoichiometric A/F since the immediate vicinity of the stoichiometric A/F forms the TWC "window" where the catalyst efficiency is high for the conversion for all three, i.e., hydrocarbon, carbon monoxide and nitrogen oxide, pollutants.

Lean exhaust conditions also have a detrimental effect on the rhodium catalyst. In the *Journal of Catalysis*, Volume 50, pages 407–418 (December, 1977) in an article entitled, "Surface Interaction in the System Rh/Al$_2$O$_3$", the authors report that rhodium interacts strongly with gamma alumina. Under lean exhaust conditions at elevated temperatures, rhodium interacts with and diffuses into the gamma alumina particles. Thus, exposure of TWC systems containing gamma alumina-supported rhodium to lean exhaust conditions results in a reduction in activity believed to be due to a loss of rhodium accessibility to the exhaust system.

The art has devised various methods to improve the catalyst efficiency of Pt/Rh based TWC systems and widen the TWC window. For example, to reduce the rhodium-gamma alumina support interactions, the art has suggested substituting alpha-alumina (U.S. Pat. No. 4,172,047) or zirconia (U.S. Pat. No.4,233,189) as a support material which is not interactive with rhodium. However, alpha-alumina and zirconia are relatively low surface area materials, which is disadvantageous as catalyst activity in such use depends to a certain extent on the surface of the support. During the operation of the vehicle, various catalyst poisons such as lead, zinc and phosphorus are generated from the consumption of fuel and engine oil and deposit non-selectively on the active surfaces of the catalyst metals thereby reducing the available metal surface area of the metal catalyst. As the initial surface area of the TWC material is already low due to the use of the low surface area alpha-alumina or zirconia, the deposition of the poisons may accelerate loss of activity by the TWC system to an unacceptable level.

U.S. Pat. Nos. 3,993,572 and 4,157,316 represent attempts to improve the catalyst efficiency of Pt/Rh based TWC systems by incorporating a variety of metal oxides, e.g., rare earth metal oxides such as ceria and base metal oxides such as nickel oxides, in the TWC system. Thus, in an article entitled "Three Way Catalyst Response To Transients" in *Ind. Eng. Chem. Prod. Res. Dev.* 1980, 19, 288-293 the authors, Schlatter et al report that the operating environment of three-way catalysts is characterized by oscillations of the feed stream composition which occur with a frequency in the order of 1 Hz. It has been suggested that the incorporation of an "oxygen storage" component in the catalyst moderates the effects of the rapid changes between rich and lean exhaust stoichiometries. The authors question the validity of the conventional explanation that the storage component adsorbs excess oxygen during excursions on the lean side of the stoichiometric set point and releases it during subsequent excursions on the rich side. The authors also suggest that the presence of cerium on the rhodium-impregnated spheres in a "fresh" three-way catalyst enhances the performance of the catalyst under transient or oscillating feed stream conditions by increasing either the amount or the stability of the oxidized rhodium species. In a later article, published in the same journal, entitled "Ceria-Promoted Three-Way Catalysts for Auto Emisssion Control" *Ind. Eng. Chem. Prod. Res. Dev.* 1982, 21, 274-288, the author, Kim reports that ceria is the best non-noble metal oxide promoter for a typical Pt-Pd-Rh TWC supported on alumina catalyst largely because it enhances the water-gas shift reaction ($CO + H_2O = CO_2 + H_2$) and possibly due, in part, to the additional oxygen storage it provides to the TWC.

U.S. Pat. No. 4,539,311 discloses a catalyst for treating motor vehicle exhaust fumes which catalyst is said to have an improved tolerance for lead. A high surface area alumina is impregnated first with a barium moiety, such as an aqueous solution of a barium compound which decomposes to produce barium oxide on firing at over 400° C., and, after such firing, is subsequently impregnated with a dispersion of a platinum group metal moiety such as by soaking the alumina in an aqueous solution of a metal compound which on firing at over 400° C. decomposes to leave behind either the platinum group metal or a compound which converts to the metal when the catalyst is placed in use. The catalyst is made by coating a honeycomb support with alumina incorporating ceria. The dried and calcined alumina coating was then soaked in an aqueous solution of barium nitrate, dried and fired and then soaked in an aqueous solution of chloroplatinic acid, dried and fired. The firing steps were carried out at 550° C.

U.S. Pat. No. 4,294,726 discloses a TWC catalyst composition containing platinum and rhodium obtained by impregnating a gamma alumina carrier material with an aqueous solution of cerium, zirconium and iron salts or mixing the alumina with oxides of, respectively, cerium, zirconium and iron, and then calcining the material at 500° to 700° C. in air after which the material is impregnated with an aqueous solution of a salt of platinum and a salt of rhodium dried and subsequently treated in a hydrogen-containing gas at a temperature of 250°-650° C. The alumina may be thermally stabilized with calcium, strontium, magnesium or barium compounds. The ceria-zirconia-iron oxide treatment is followed by impregnating the treated carrier material with aqueous salts of platinum and rhodium and then calcining the impregnated material.

U.S. Pat. No. 4,504,598 discloses a process for producing a high temperature resistant TWC catalyst. The process includes forming an aqueous slurry of particles of gamma or activated alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

European patent application No. 0152052, published Aug. 21, 1985, discloses a monolithic TWC catalyst prepared by impregnating an active alumina powder with a soluble platinum compound, calcining the impregnated powder and then mixing it with a hydrous cerium hydroxide powder, the particle size and water content of which is controlled to assure dispersibility. The mixture is pulverized in a dilute nitric acid solution to prepare a coating slurry which is deposited upon a monolithic support, dried and then calcined. The monolithic support was then impregnated with an aqueous solution of a rhodium salt and dried to provide a finished catalyst.

Japanese patent publication No. 59-127649 published July 23, 1984 (Application Number No. 58/1983-336) dislcoses a TWC and monolithic catalyst having a first base layer of activated alumina supporting platinum, palladium, cerium and lanthanum catalytic elements and a second, upper layer of alumina on which rhodium, iron and lanthanum is dispersed. A first alumina slurry comprising alumina particles impregnated with cerium nitrate and lanthanum nitrate is prepared and coated upon the monolith, dried and calcined at 700° C. The coated monolith was then immersed in an aqueous solution of the platinum compound and dried to form the first layer. Another alumina slurry was prepared with the alumina particles impregnated with lanthanum nitrate and ferric nitrate and calcined and coated onto the monolithic carrier containing the first alumina layer. The monolith was thereafter immersed in an aqueous rhodium compound solution and withdrawn and dried to provide the upper layer.

Copending and Commonly Owned Patent Applications

The following copending U.S. patent applications, the disclosure of each of which is incorporated by reference herein, are owned by the assignee of this application and disclose three-way catalyst compositions particularly adapted for treating the exhaust gases of internal combustion engines.

Catalyst compositions which are particularly useful in the treatment of exhaust gases of internal combustion engines operated at a lean air-to-fuel ratio are disclosed in the following copending U.S. patent applications: Ser. No. 832,499, filed Feb. 20, 1986 as a continuation-in-part ("CIP") of Ser. No. 620,415, filed June 14, 1984, both in the name of C. Z. Wan et al and entitled "Three-Way Catalyst For Lean Operating Engines"; Ser. No. 842,746, filed Mar. 17, 1986 as a CIP of Ser. No. 696,950, filed Jan. 31, 1985, itself a CIP of the aforesaid Ser. No. 620,415, both in the name of C. Z. Wan et al and entitled "Three-Way Catalyst For Lean Exhaust Systems"; Ser. No. 772,296, filed Sept. 4, 1985 as a continuation-in-part of Ser. No. 696,947, filed Jan. 31, 1985, itself a CIP of the aforesaid Ser. No. 620,415, both in the name of C. Z. Wan et al and entitled "Three-Way Catalysts of Improved Efficiency". The catalyst compositions disclosed in these applications comprise rhodium and a second platinum group metal selected from platinum, palladium and mixtures thereof and rare earth metal oxides. The rhodium, or at least a substantial portion of it, is dispersed on particles which are substantially free of rare earth metal oxides, the inventors having discovered that, during extended use of the TWC catalyst under high temperature conditions, the rhodium metal content of a rare earth-promoted TWC on alumina catalyst interacts with the rare earth metal. This aggravates the deleterious effect on catalyst activity of the interaction between rhodium and gamma alumina, noted above with reference to the *Journal of Catalysis* article. In order to overcome the problem of rhodium-rare earth metal oxide interactions, the rhodium content is dispersed on alumina particles which are substantially free of rare earth metal oxides and which preferably have an alkaline earth metal oxide combined therewith. The second platinum group metal (platinum and/or palladium) is preferably dispersed on alumina particles which have a rare earth metal oxide combined therewith or may be dispersed on particles of a rare earth metal oxide or particles of alumina. The rhodium particles preferably have an initial average particle size greater than 30 Angstroms in diameter to further reduce interaction of the rhodium with the support. Thus, at least two different types of particles are included in the catalytic coating, which may be dispersed on a monolithic carrier means. The first type of particle comprises rhodium and, optionally, platinum and/or palladium, dispersed on a high surface area alumina which is substantially free of rare earth metal oxides. The second type of particle oomprises platinum and/or palladium dispersed on a high surface area alumina which may optionally include rare earth metal oxides either as a thermal stabilizer for the alumina or as an active catalytic species. Optionally, a third type of particle comprising a bulk rare earth metal oxide, optionally having platinum and/or palladium thereon, may also be utilized.

Copending U.S. patent application Ser. No. 722,905, filed Apr. 12, 1985 in the name of C. Z. Wan et al and entitled "High Temperature Catalyst Compositions For Internal Combustion Engine" discloses a TWC catalyst adapted for treating exhaust gases from heavy duty truck engines. This catalyst uses at least three types of catalytic particles dispersed as a coating upon a ceramic substrate as follows: thermally stabilized activated alumina particles having a platinum group metal dispersed thereon, catalytic promoter metal oxide particles which are substantially free of platinum group metal, and particles of an inert, thermally stable, filler material. The stabilized alumina support material may be thermally stabilized with lanthana/baria materials, the catalytic promoter oxides may be selected from oxides of chromium, titanium, zirconium and cerium and the inert thermally stable filler material may be particles of one or more of cordierite, mullite, magnesium aluminum titanate and the like.

While the foregoing Commonly Owned patent applications disclose useful advances in the art, further improvement in the catalyst compositions is desirable, particularly with respect to improving the stability of the alumina-containing coating or "washcoat" of catalytic material coated upon a carrier substrate. Such improved stability is among the advantages provided by the present invention.

SUMMARY OF THE INVENTION

In accordance with the present invention there is provided a method of making a catalyst composition comprising a platinum group metal catalytic component and an activated alumina stabilized against thermal degradation, the method comprising the following steps: (a) applying a coating of activated alumina to a carrier substrate; (b) calcining the resultant alumina-coated substrate to provide a calcined coating of activated alumina thereon; (c) dispersing one or more platinum group metal components on the activated alumina; (d) after step (c), dispersing a stabilizer-precursor onto the calcined coating on the carrier, e.g., impregnating the calcined coating with an aqueous solution of a thermal stabilizer-precursor; and (e) calcining the coating having the stabilizer-precursor dispersed thereon. The calcinations are carried out at a temperature of not more than about 600° C., preferably at not more than about 500° C., most preferably at not more than about 350° C. The calcinations may be carried out in air. In another embodiment of the invention, the activated alumina of steps (a) and (b) is an unstabilized alumina.

In another aspect of the invention, the one or more platinum group metal catalytic components comprise (i) a platinum component, (ii) a palladium component, (iii) a platinum component and a palladium component, (iv) a palladium component and a rhodium component, or (v) a platinum component and a rhodium component. Yet another aspect of the invention includes incorporating a solid, particulate rare earth metal oxide with the activated alumina, e.g., ceria, optionally an aluminum-stabilized ceria. The ceria preferably comprises at least 90%, preferably at least 95%, more preferably at least 99% (all by weight) ceria or ceria precursors, measured as $CeO_2$, exclusive of any aluminum-stabilizers and catalytic components, if present. The ceria optionally has one or more non-rhodium platinum group metal catalytic components dispersed thereon.

In accordance with another aspect of the present invention there is also provided a method of making a catalyst composition comprising an activated alumina having one or more platinum group metal catalytic components dispersed thereon, the method comprising the following steps: (a) dispersing one or more platinum group metal catalytic components on an activated alumina; (b) combining a solid, particulate ceria with the activated alumina to form an alumina-ceria mixture; (c) applying a coating of the alumina-ceria mixture to a carrier substrate; (d) calcining the substrate coated with the alumina-ceria mixture to provide thereon an activated alumina-containing calcined coating; (e) after step (a), impregnating the calcined coating on the carrier with a solution of a stabilizer-precusor; and (f) calcining the stabilizer-precursor impregnated coating.

Still another aspect of the invention provides a method of making a catalyst composition comprising an activated alumina having one or more platinum group metal catalytic components dispersed thereon, the method comprising the steps of: (a) dispersing one or more platinum group metal catalytic components on an activated alumina; (b) applying to a carrier substrate the activated alumina having one or more platinum group metal catalytic components thereon and calcining the resultant coating on the carrier substrate; and (c) carrying out steps (a) and (b) under limited acidification conditions whereby the platinum, rhodium and palladium catalytic components, when one or more are present, each has a dispersion as measured by the CO chemisorption procedure set forth in Example 2 of at least about 0.3 CO/PM, preferably at least about 0.4 CO/PM, after reduction in hydrogen at 750° C. in the case of platinum and rhodium and has a dispersion of at least about 0.3 CO/PM after heating in air for one hour at 750° C. followed by reduction in hydrogen at 350° C. for one hour.

Another method aspect of the invention provides for the preliminary step of milling a slurry of particles of the activated alumina and controlling acidification conditions by carrying out the milling in a non-acidified milling liquid, e.g., water, to reduce the size of the particles in a first stage size reduction step. The invention provides for carrying out a second stage size reduction step comprising milling the particles of activated alumina obtained from the first step in an acidified milling liquid, e.g., in an aqueous solution of a suitable acid.

The present invention also provides a catalyst composition comprising an activated alumina having one or more platinum group metal catalytic components dispersed thereon, the alumina and dispersed catalytic components having been applied to a carrier substrate and calcined and dispersed thereon to provide a calcined coating on the carrier substrate, which is then stabilized by impregnating the calcined coating with a solution of a stabilizer precursor, and calcining the stabilizer precursor-impregnated coating.

Generally, the compositions of the invention include the various combinations obtained by the above-described method aspects of the invention.

The present invention comprises two broad aspects which may be used conjointly or independently of each other. One of these broad aspects encompasses applying a thermal stabilizer to a previously calcined coating of the catalytic material on a carrier substrate and to catalysts obtained thereby. The other broad aspect encompasses coating a carrier substrate with an activated alumina having one or more of platinum, rhodium and palladium catalyst components dispersed thereon, and calcining the coated substrate, all under limited acidification conditions to obtain at least a minimum dispersion of the catalytic components on the catalyst.

BRIEF DESCRIPTION OF THE DRAWING

The sole FIGURE of the drawing is a simplified block flow diagram illustrating one embodiment of the method of the invention.

DETAILED DESCRIPTION OF THE PREFERRED EMBODIMENTS

The catalysts of the present invention may take the form of a carrier substrate, such as a monolithic honeycomb or a foam-type ceramic or metal structure on which a coating of catalytic material is applied. Thus, the catalytic material may be provided in the form of a catalytic coating applied to a monolithic honeycomb element, usually comprising a cylindrical shaped member having a plurality of fine, parallel gas flow passages extending therethrough. Typically, there may be from 60 to 600 or more such parallel fine gas flow passages per square inch of the face of the honeycomb member, the walls of these passages being coated with the catalytic material. The coating of catalytic material may be applied by dipping the monolith into a slurry of the catalyst particles in water. The monolithic honeycombs may be made from metals such as corrosion-resistant stainless steel, or more typically, from ceramic type materials comprising refractory crystalline materials such as sillimanite, magnesium silicates, zirconia, petalite, spodumene, cordierite, mullite, alumino-silicates or combinations of such materials. Generally, such materials comprise varying compositions of silica-magnesia-alumina and have some surface porosity. The catalytic coating comprises catalytic metals and/or compounds dispersed on refractory inorganic oxides, typically alumina, or alumina with one or more other oxides as additives for increased strength, heat-resistance, etc.

The catalyst composition of the invention generally comprises an activated alumina support on which catalytic metal components are dispersed. The activated alumina, as described above, provides a high surface area support which enhances the catalytic activity of the catalytic components dispersed thereon.

The catalytic components are dispersed on the activated alumina typically by impregnating the activated alumina with solutions of soluble compounds of the catalytic metals or liquid dispersions of complexes of the catalytic metal compounds. The activated alumina may also be impregnated with one or more modifiers as described below.

As explained in detail in the aforementioned copending and Commonly Owned patent applications, it may be desired to impregnate a portion of the activated alumina with one catalytic metal component and another portion of the activated alumina with another catalytic metal component and then combine the two separately impregnated batches of activated alumina to make the catalytic material of the invention. Thus, in the case of preparing a platinum/palladium/rhodium TWC catalytic material, a rhodium compound is placed into solution and the solution (which optionally may also contain soluble compounds of platinum and/or palladium) is contacted with activated alumina particles which are substantially free of rare earth oxides. The reason for this is the discovery (which forms no part of the present invention) that intimate contact between rhodium and rare earth metal oxides has a deleterious effect on operation of the catalyst after exposure to high temperatures at lean operating conditions. In any case, the rhodium compound-impregnated gamma-alumina particles are combined with another batch of activated alumina which has separately been impregnated with platinum and palladium compounds in a similar fashion. The platinum and palladium impregnated alumina advantageously may contain one or more suitable modifiers, as described below, impregnated into the alumina in the same manner as the catalytic metal compounds, in order to enhance stability of the finished product. The separate impregnated batches of alumina may either be combined in a liquid medium such as water to provide a slurry of the mixed impregnated particles in a liquid, which slurry is applied to the carrier substrate, or the separate impregnated batches of alumina may be applied successively in layers to the carrier substrate. Similarly, ceria particles, which optionally may be impregnated with one or more non-rhodium platinum group metal catalytic components, and incorporated into the catalyst composition as discussed below, may be combined with one or more or all of the impregnated alumina batches. Alternatively, the ceria may be applied to the carrier substrate as a separate layer. The monolithic substrate members may be dipped into the slurry to fill the gas flow passages thereof, whereupon excess slurry is blown out of the monoliths with compressed air and the monoliths are dried to leave behind a catalytic coating of the impregnated alumina particles on the walls of the fine gas flow passages. The monolith is then calcined in air to drive off the liquid and fix the catalyst on the alumina support, leaving behind a thin, strongly adherent catalytic coating on the carrier substrate.

As noted above, one or more modifiers may optionally be employed in activated-alumina containing catalyst compositions in accordance with the present invention. Among such modifiers are thermal stabilizers which serve to retard undesirable alumina phase transitions (e.g., gamma to alpha alumina) at elevated temperatures which may be any known stabilizer or combination of stabilizers such as, for example, one or more rare earth metal oxides, silicon dioxide, oxides of Group IVB metals (zirconium, hafnium and titanium) or one or more alkaline earth metal oxides. Other modifiers such as oxides of chromium, iron, and nickel, or their precursors, may also be employed. Some modifiers may serve more than one function, e.g., may serve as both a thermal stabilizer and a catalytic promoter. The modifier, or precursors thereof, may be impregnated from a solution or liquid dispersion into the activated alumina particles. One aspect of the present invention provides for applying one or more thermal stabilizers to a previously calcined coating of the activated alumina and catalytic components on a carrier substrate. In other aspects of the invention, one or more modifiers may be applied to the activated alumina either before or after the alumina particles are formed into an adherent, calcined coating on the carrier substrate. (As used herein and in the claims, a "precursor", whether of a thermal stabilizer, other modifier or other component, is a compound, complex or the like which, upon calcining or upon use of the catalyst, will decompose or otherwise be converted into, respectively, a thermal stabilizer, other modifier or other component.) The presence of one or more of the metal oxide thermal stabilizers tends to retard the phase transition of high surface area aluminas such as gamma and eta aluminas to alpha-alumina, which is a low surface area alumina. The retardation of such phase transformation tends to prevent or reduce the occlusion of the catalytic metal component by the alumina with the consequent decrease of catalytic activity. The amount of metal oxide thermal stabilizer combined with the alumina may be from about 0.05 to 30 weight percent, preferably from about 0.1 to 25 weight percent, based on the total weight of the combined alumina, stabilizer and catalytic metal component. Alkaline earth metal oxides which may be thus used to stabilize the catalytic coating are oxides of barium, strontium, calcium and magnesium. Silicon dioxide and/or oxides of Group IVB metals (zirconium, hafnium and titanium) may be employed for the purpose. Among the rare earth metal oxides which may be similarly employed in the catalyst are oxides of cerium, lanthanum, neodymium, praseodymium and mixtures thereof, including the commercially available mixtures of rare earth metal oxides.

Another component which may advantageously be added to the catalyst composition of the invention is ceria in bulk form, which is known to promote oxidation and reduction reactions. By bulk form it is meant that particles of ceria are admixed with the particles of activated alumina so that the ceria is present in solid or bulk form as opposed to, for example, impregnating the alumina particles with a solution of a cerium compound which upon calcination is converted to ceria dispersed within the alumina particles. Other promoters for oxidation and reduction reactions may also be included, for example, oxides of one or more of manganese, vanadium, copper, iron, cobalt, chromium, zirconium, nickel and the like. Such materials may be introduced as the oxide or as a precursor which is converted to the oxide upon calcination or upon use of the catalyst. For example, TWC catalysts comprising a platinum group metal and a base metal oxide selected from oxides of metals having an atomic number from 25 to 28 plus rhenium and mixtures thereof, are disclosed in U.S. Pat. No. 4,157,316 of C. E. Thompson et al. Such oxidation-reduction promoters may be incorporated in bulk form and are usually incorporated in the catalytic composition in amounts ranging from about 0.05 to about 50% by weight, preferably from about 0.5 to about 25% by weight of the catalytic material.

It is also an aspect of the present invention that beneficial effects are attained by utilizing a high proportion of bulk ceria of suitably high surface area in the catalytic composition of the invention. It has been observed that the promoting effects of the bulk ceria are enhanced and catalysts of high activity and durability are attained by providing increased quantities of bulk ceria, preferably aluminum-stabilized bulk ceria, in the catalytic coating. The aluminum-stabilized ceria has been found to retain its surface area under the high temperature and other conditions of use of the catalyst, as explained more fully in Commonly Owned and copending application Ser. No. 880,270, filed concurrently herewith. Because the stabilized ceria is superior in terms of retaining its high surface area, it becomes useful to impregnate the bulk ceria with a non-rhodium platinum group metal catalytic component as illustrated in the flow chart of the FIGURE.

In any case, in accordance with another aspect of this invention, it is desirable to provide bulk ceria of at least one square meter surface area per cubic inch of catalyst volume in the composition of the catalyst. Generally, it is preferred to provide from about 0.1 to about 2 grams per cubic inch of such ceria. These would provide in the finished catalyst a contribution to surface area of the bulk ceria of from about 1 to 200 square meters of ceria per cubic inch of catalyst, preferably from about 2 to 150 square meters of ceria per cubic inch.

In accordance with another aspect of the present invention, a beneficial effect is provided by utilizing as the bulk ceria a ceria of high purity and dispersing at least a portion of the platinum group metal component on the bulk ceria. Commercially available ceria utilized as the bulk ceria usually comprises at least about 90 weight percent, measured as $CeO_2$, of the total rare earth metal oxide constituents, the non-ceria rare earth metal oxides comprising predominantly lanthana, plus lesser amounts of neodymium oxide and praseodymium oxide and still smaller amounts of other rare earth metal oxides.

It is conventional wisdom in the art that the platinum group metal catalytic component should be dispersed upon a high surface area material, i.e., the activated alumina, with which it is compatible. However, it has been found advantageous in the practice of the present invention to also disperse a platinum group metal component, other than a rhodium component, onto the bulk ceria promoter. It has further been found to be advantageous if the ceria is a high purity ceria, such as a low temperature calcined ceria comprising at least about 90, preferably at least about 95, more preferably at least about 99, weight percent, measured as $CeO_2$, of the total rare earth metal oxide constituents.

With respect to the amount of platinum group metal catalytic component utilized in the catalyst, it is of course desired to minimize the amount of these expensive materials consistent with providing an effective catalyst. Since the amount of platinum and palladium occurring in naturally mined ores is much greater than the amount of rhodium occurring in such ores, the proportion of platinum (and palladium, when palladium is utilized) is usually significantly higher than that of rhodium in the catalyst. Thus, the combined weight of platinum, or of platinum and palladium, is usually in excess of twice the amount of rhodium, preferably at least four times the amount of rhodium, and most preferably at least ten times the amount of rhodium present. The total weight of platinum group metal catalytic component utilized, measured as the metal, typically will not exceed about 10 weight percent of the weight of the catalytic material, for example, it will comprise from about 0.01 to about 8%, more preferably from about 0.05 to 5 weight percent of the catalytic material. In this context, reference to the "catalytic material" is to the material comprising alumina, catalytic components and stabilizers and/or, if present, other modifiers suoh as reaction promoters, and excludes the monolithic carrier substrate. When the catalytic material is applied as a thin coating to a monolithic carrier substrate, the proportions of ingredients are conventionally expressed as grams of material per cubic inch of catalyst as this measure accommodates different gas flow passage cell sizes in different monolithic carrier substrates. For typical automotive exhaust gas catalytic converters, the catalyst composition (catalyst material plus monolithic substrate) generally may comprise from about 0.25 to about 4.0, preferably about 0.25 to about 3.0 $g/in^3$ of catalytic material coating, including about 0 to about 25, preferably about 0.1 to about 15 $g/ft^3$ rhodium and about 0.5 to about 150, preferably about 1 to about 90 $g/ft^3$ of platinum and/or palladium.

In preparing the catalyst, a platinum group metal catalytic component such as a suitable compound and/or complex of any of the platinum group metals may be utilized to achieve dispersion of the catalytic component on the activated alumina support particles. (As used herein and in the claims, the term "platinum group metal catalytic component" means any platinum group metal compound, complex, or the like which, upon calcination or use of the catalyst decomposes or otherwise converts to a catalytically active form, usually, the metal. The term "platinum group metal" has its usual meaning as comprising the metals platinum, rhodium, palladium, iridium, ruthenium and osmium. Water soluble compounds or water dispersible complexes as well as organic soluble or dispersible compounds or complexes of one or more platinum group metals may be utilized as long as the liquid used to impregnate or deposit the catalytic metal compounds onto the alumina support particles do not adversely react with the catalytic metal or its compound or complex or the other components of the slurry, and are capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are preferred. For example, suitable compounds are chloroplatinic acid, potassium platinum chloride, ammonium platinum thiocyanate, amine solubilized platinum hydroxide, rhodium chloride, rhodium oxide, rhodium sulfide, rhodium nitrate, hexamine rhodium chloride, etc. If both platinum and palladium are to be impregnated onto the activated alumina particles, both are preferably in water soluble form such as, for example, as the respective amine hydroxide or as chloroplatinic acid, palladium nitrate or palladium chloride. During the calcination step, or at least during the initial phase of use of the catalyst, such compounds are converted into a catalytically active form of the platinum group metal or a compound thereof.

Improved stabilization of the alumina of the catalytic material is attained by impregnating the catalytic material with a liquid dispersion or solution of a suitable stabilizer precursor after the catalytic material has been calcined, preferably after it has been coated onto the carrier substrate and calcined to form a thin, adherent coating thereon. The stabilizer is one which enhances the properties of the catalyst composition, especially one which improves thermal stability of the catalyst composition. Without wishing to be bound by any particular theory, one explaination for the improved modification or thermal stabilization results attained by "post-stabilization", i.e., by adding the stabilizer to the in-place, previously calcined catalytic coating on the carrier substrate, is the possibility that both the alumina particles and the stabilizer on the activated alumina particles may react with the acidic media such an acidic solution of platinum group metals, and acidic ballmilling agents, etc., during the formation of a catalytic coating which results in appreciable loss in alumina stabilization efficiency. The "post-stabilization" method avoids the solubilization of the alumina and/or stabilizer and provides an effective means for contacting the stabilizer with alumina without interfering with the dispersion of the precious metals due to the neutral or somewhat basic nature of the stabilizers used. In any event, regardless of whether or not the theory is correct, it has been found that post-stabilization of the catalytic coating, i.e., deferring application of the one or more stabilizers, to the catalytic coating until after it has been applied as an adherent coating to the carrier substrate, provides enhanced results, as indicated by the following Examples.

EXAMPLE 1

In order to demonstrate the advantage of the post-stabilization technique of the invention with respect to thermal degradation of an activated alumina coating, the following experiment was carried out. An activated gamma-alumina having a BET surface area of 130 m²/g and a particle size of 95% by weight of the particles being less than 50 microns in diameter was used. For convenience, the unimpregnated gamma-alumina was designated as Alumina Powder A. Portions of Alumina Powder A were respectively impregnated with aqueous solutions containing barium nitrate (Alumina Powder B), lanthanum nitrate (Alumina Powder C), zirconium nitrate (Alumina Powder D) and a mixture of lanthanum nitrate and barium nitrate (Alumina Powder E). After drying and calcining at 600° C. for one hour, Alumina Powder B containing 0.8 weight percent BaO, Alumina Powder C containing 2.5 weight percent $La_2O_3$, Alumina Powder D containing 5.0 weight percent $ZrO_2$ and Alumina Powder E containing 1.65 weight percent $La_2O_3$ and 1.35 weight percent BaO were obtained, respectively. Each alumina powder was separately ballmilled in aqueous media in the presence of 5 weight percent acetic acid to form a slurry having an average alumina particle size of 90% by weight of the particles being less than 12 microns in diameter. Each slurry was dried in a thin layer on a glass slide at 125° C. for three hours and then calcined in air at 350° C. for one hour to obtain a washcoat. Thus, washcoat A, B, C, D and E each corresponded to the acid-milled Alumina Powder A, B, C, D and E, respectively. Four portions of washcoat A (no stabilizer) were further respectively impregnated with aqueous solutions of the same stabilizer precursor compounds as used to obtain stabilized Alumina Powder B, C, D and E. After a second drying and calcining in air at 350° C. for one hour, improved post-stabilized washcoats B, C, D and E were obtained, respectively. Alumina washcoats removed from the glass slides as well as the corresponding alumina powders were then aged in air at 1100° C. for four hours. The results of BET surface areas after aging are shown in TABLE I.

The results of TABLE I show that conventional methods to obtain a washcoat by acid-milling of stabilized alumina to reduce particle size result in appreciable loss in the efficiency of the alumina stabilization. The results of TABLE I clearly demonstrate that an improved washcoat can be obtained by using the post-stabilization impregnation of effective stabilizers in accordance with one aspect of the present invention.

TABLE I

| | | Surface Area Retention After Aging | | |
| | | Surface Area (BET) m²/g | | |
| Sample (Alumina) | Stabilizer Content[1] | Alumina Powder | Washcoat (acid-milled) | Improved Washcoat |
| --- | --- | --- | --- | --- |
| A | — | 40 | 12 | — |
| B | 0.8% BaO | 67 | 20 | 56[2] |
| C | 2.5% $La_2O_3$ | 74 | 15 | 65 |
| D | 5.0% $ZrO_2$ | 70 | 33 | 60 |
| E | 1.65% $La_2O_3$ 1.35% BaO | 80 | 58 | 76 |

[1]Stabilizer content expressed as weight percent of the indicated stabilizer based on the total weight of stabilizer plus alumina.
[2]Contained 3.0 weight percent BaO In order to isolate the dramatic improvement in retention of surface area after thermal aging provided by the post-stabilization impregnation technique of the invention, activated aluminas were size-reduced by conventional ball-milling in an acidified aqueous medium. However, it is a feature of the present invention to limit acidification of the activated alumina particles to the extent possible consistent with attaining a suitable degree of size reduction and impregnating the alumina particles with platinum group metal catalytic component, which often are provided by acidic compounds. It has been found, as one aspect of the present invention, that limiting acidification of the activated alumina particles is beneficial in providing a durable catalyst composition. Acidification of the activated alumina particles is conventionally carried out, at least in impregnating the alumina with compounds of the platinum group metals. In addition, it is conventional practice when milling the alumina powder particles to reduce their size to a desired size range, to incorporate an acid into the liquid slurry of particles being milled. Activated alumina is usually available in particulate size ranges which are much too large to be slurried and coated onto monolithic honeycombs including the fine gas flow passages or otherwise used to make catalytic compositions of the invention. For example, activated alumina is usually available in a particle size of 50% by weight of the material being greater than 30 microns in diameter. Therefore, the particles must be reduced in size as the first step in making the catalysts of the invention. For example, it is conventional practice to ballmill the powder of activated alumina particles as received from the manufacturer, to a much smaller particle size range on the order of particles of a size of 90% by weight of the material having a diameter of less than 30 microns. The milling is carried out in a liquid milling medium, usually an aqueous medium, in which the alumina is dispersed as a solid phase to provide an aqueous slurry of alumina. As used herein and in the claims, "slurry" refers to a continuous liquid phase having fine particles of solids dispersed therein. As the ballmilling or other grinding of the alumina is carried out, when a certain size range is reached the alumina will tend to form a gel in the liquid which renders further size reduction of the particles virtually impossible. In order to prevent the formation of a gel the slurry being milled is conventionally acidified, for example, with nitric acid and to permit further size reduction. Other acids, such as sulfuric acid, oxalic acid and acetic acid may be employed for the purpose. Whatever acid is used, it generally has the undesired effect of hydroxylating a portion of the $Al_2O_3$ of the activated alumina. Acetic acid, because it is a weaker acid and therefore arguably does less damage to the alumina, is a preferred acidifying medium. Conventional practice thus calls for ballmilling the alumina in a water solution of nitric or acetic acid. One aspect of the present invention provides for minimizing acidification of the slurry by eliminating the use of an acidifying medium at least during an initial phase of ballmilling or other size reduction in a liquid medium, and then completing the ballmilling (or other size reduction) of the alumina after introduction of an acidic form or compound of a platinum group metal as a catalytic component. The acidic platinum group metal compound thus provides, in a second stage of size reduction, not only the platinum group metal catalytic component but sufficient acidification to prevent gel formation, preferably without necessity of conventional acidifiers. In general, the use of acidifiers other than acidic platinum group metal compounds or complexes is minimized or, preferably, avoided altogether, it having been found that introduction of acidic platinum group metal compounds into a slurry of the activated alumina particles prior to or at the start of the second stage of size reduction provides sufficient acidification to permit carrying out the size reduction. By thus limiting acidification of the activated alumina particles, the properties of the resultant catalyst composition are enhanced as indicated by the following Examples. The adverse effect on activated alumina of exposing it to acid, even acetic acid, for prolonged periods of ballmilling is illustrated by the following Example 2.

EXAMPLE 2

The Alumina Powder B of Example 1 containing 0.8% by weight BaO was divided into separate batches. One batch was ballmilled for the time periods indicated below in an aqueous solution of 5% acetic acid, and a second batch was ballmilled for the same periods of time in a 7% aqueous solution of acetic acid. Two other batches were each calcined in air at 1000° C. for eight hours and the calcined powder was then divided into two batches, one batch being ballmilled for the indicated periods of time in a 5% acetic acid solution, and the second batch being ballmilled for the indicated periods of time in a 7% acetic acid solution. TABLE 2 below sets forth the amount of soluble alumina formed, in parts per million as determined by a dialysis technique, resulting from these acidifying treatments. The respective portions of the alumina solubilized by the acid is shown in TABLE 2, and indicates that increases in milling time in the acidified solution, and increases in the concentration of the acid, increase the amount of undesired solubilization of the alumina. The results also indicate that the high-temperature calcined alumina is more susceptible to solubilization by the acid ballmilling treatment than is the uncalcined alumina.

The results attained are shown in the following TABLE 2.

TABLE 2

Soluble $Al_2O_3$ Produced From Ballmilling Of BaO Stabilized Activated Alumina

| Support | % Acetic Acid-Milling Medium | Milling Time | Soluble $Al_2O_3$ ppm |
|---|---|---|---|
| Stabilized Alumina | 5% | 8 hours | 600 |
|  |  | 12 hours | 600 |
|  |  | 16 hours | 700 |
|  | 7% | 8 hours | 3700 |
|  |  | 12 hours | 3900 |
|  |  | 16 hours | 5400 |
| Stabilized Alumina After Calcination at 1000° C. for 8 hrs. | 5% | 8 hours | 2000 |
|  |  | 12 hours | 5300 |
|  |  | 16 hours | 6100 |
|  | 7% | 8 hours | 7400 |
|  |  | 12 hours | 8000 |
|  |  | 16 hours | 9900 |

The acidified milling medium not only solubilizes a portion of the activated alumina but, as shown by the following Example 3, the presence of certain acids affects the dispersion of the platinum group metal on the catalyst. Dispersion of the platinum group metal catalytic component is measured by a CO chemisorption technique in accordance with a method described in detail by Freel, J. (*Journal of Catalysis*, 25, 139 [1972]). The degree of dispersion of the platinum group metal on the refractory metal oxide, e.g., activated alumina, on which it is dispersed, is indicated by the number of carbon monoxide molecules which can be absorbed by one platinum group metal atom (e.g., platinum, rhodium or palladium) at 25° C. and is represented herein by the symbol "CO/PM". The dispersion is measured on an activated alumina which is substantially free of any modifier such as a thermal stabilizer, or any other substances in amounts which would interfere with the test. Thus, the dispersion is measured as an unstabilized, unmodified, substantially unadulterated activated alumina in order that the presence of stabilizers not influence the measurement. Throughout this specification and claims, the term "CO chemisorption" should be understood to mean the above described procedure for measuring dispersion of a platinum group metal on a refractory metal oxide.

EXAMPLE 3

A series of three washcoats, each bearing one of a platinum, a rhodium and a palladium component were prepared to demonstrate the acid effect on dispersion of the respective platinum group metal catalytic component during milling. The Alumina Powder A in Example 1 was used in this study. The alumina powder was first milled in water to obtain a particle size of 90% by weight of the particles being less than 30 microns in diameter. Respective batches of the alumina particles were then impregnated with a chloroplatinic acid solution, a rhodium chloride solution and a solution of $H_2PdCl_4$. The milling was continued in the presence of various aqueous acid solution milling agents in separate small batches to a particle size of 90% by weight of the particles being less than 12 microns in diameter. The final slurry was spread in thin layers on glass slides, dried and then calcined in air at 350° C. for one hour to form a washcoat. In the case of the palladium-bearing washcoat, a second batch was similarly calcined in air at 750° C. for one hour. The washcoats bearing the platinum group metal catalytic component were then removed from the glass slides and subjected to CO chemisorption dispersion measurement.

The results attained with each of a platinum, a rhodium and palladium catalytic component catalyst is set forth in the following TABLES 3A, 3B and 3C.

In TABLE 3A, the platinum group metal component comprises 1% by weight platinum, measured as the elemental metal, of the total weight of alumina plus platinum. The platinum was dispersed on the activated alumina particles by impregnating the latter with an aqueous solution of chloroplatinic acid.

TABLE 3A

Effect of Milling Agents on Platinum Dispersion

| Milling Agent | Acid Equivalents mole % | $pH^{(a)}$ | CO/PM$^{(b)}$ 400° C.$^{(c)}$ | 750° C.$^{(d)}$ |
|---|---|---|---|---|
| None | — | 4.8 | 1.03–1.13 | 0.47–0.52 |
| 0.5% wt. HOAc | 8.33 × 10$^{-3}$ | 4.4 | 0.91 | 0.33 |
| 1.0% wt. % HOAc | 1.67 × 10$^{-2}$ | 4.3 | 0.79 | 0.28 |
| 1.5% wt. % HOAc | 2.5 × 10$^{-2}$ | 4.1 | 0.86 | 0.24 |
| 1% wt. HCl (37%) | 1.0 × 10$^{-2}$ | 4.5 | 1.06 | 0.56 |
| 1% wt. HNO$_3$ (70%) | 1.2 × 10$^{-2}$ | 4.0 | 0.79 | 0.08 |
| 1% wt. | 1.0 × 10$^{-2}$ | 4.6 | 0.66 | 0.31 |

TABLE 3A-continued
Effect of Milling Agents on Platinum Dispersion

| Milling Agent | Acid Equivalents mole % | pH[a] | CO/PM[b] 400° C.[c] | 750° C.[d] |
|---|---|---|---|---|
| H$_2$SO$_4$ (98%) | | | | |

[a]pH of slurry of platinum compound-impregnated alumina particles in milling agent.
[b]Platinum dispersion as measured by CO chemisorption at 25° C., CO molecules per Pt atom.
[c]Sample reduced with H$_2$ at 400° C. for one hour before dispersion determination.
[d]Sample reduced with H$_2$ at 750° C. for one hour before dispersion determination.

In TABLE 3B, the rhodium component comprises 0.689 weight percent rhodium, measured as the elemental metal, of the total weight of rhodium plus alumina. The rhodium was dispersed on the activated alumina particles by impreganating them in an aqueous solution of rhodium chloride.

TABLE 3B
Effect of Milling Agents on Rhodium Dispersion

| Milling Agent | Acid Equivalents mole % | pH[a] | CO/PM[b] 400° C.[c] | 750° C.[d] |
|---|---|---|---|---|
| None | — | 5.6 | 1.75–1.95 | 0.54–0.57 |
| 0.5% wt. HOAc | 8.33 × 10$^{-3}$ | 5.2 | 1.0 | 0.40 |
| 1.0% wt. HOAc | 1.67 × 10$^{-2}$ | 5.2 | 0.1 | 0.07 |
| 1.5% wt. HOAc | 2.5 × 10$^{-2}$ | 5.0 | 0.1 | 0.08 |
| 0.5% wt. HCl (37%) | 0.5 × 10$^{-2}$ | 5.2 | 1.64 | 0.59 |
| 0.5% wt. HNO$_3$ (70%) | 0.6 × 10$^{-2}$ | 4.8 | 1.64 | 0.15 |
| 0.5% Wt. H$_2$SO$_4$ (98%) | 0.5 × 10$^{-2}$ | 4.9 | 1.08 | 0.43 |

[a]pH of slurry of rhodium compound-impregnated alumina particles in milling agent.
[b]Rhodium dispersion as measured by CO chemisorption at 25° C., CO molecules per Rh atom.
[c]Sample reduced with H$_2$ at 400° C. for one hour before dispersion determination.
[d]Sample reduced with H$_2$ at 750° C. for one hour before dispersion determination.

In TABLE 3C, the palladium component comprises 1.0 weight percent palladium, measured as the elemental metal, of the total weight of palladium plus alumina. The palladium was dispersed on the activated alumina particles by impregnating them in an aqueous solution of H$_2$PdCl$_4$.

TABLE 3C
Effect Of Milling Agents On Palladium Dispersion

| Milling Agent | Acid Equivalents mole % | CO/PM[a] 350° C.[b] | 750° C.[b] |
|---|---|---|---|
| None | — | 0.56 | 0.55 |
| 0.5% wt. HOAc | 8.33 × 10$^{-3}$ | 0.18 | 0.17 |
| 1.0% wt. HOAc | 1.67 × 10$^{-2}$ | 0.18 | 0.18 |
| 1.5% wt. HOAc | 2.5 × 10$^{-2}$ | 0.29 | 0.24 |
| 1% wt. HCl | 1.0 × 10$^{-2}$ | 0.50 | 0.51 |
| 1% wt. HNO$_3$ | 1.2 × 10$^{-2}$ | 0.39 | 0.195 |

[a]palladium dispersion as measured by CO chemisorption at 25° C., CO molecules per Pd atom after reduction in dry hydrogen at 350° C. for one hour.
[b]air exposure at indicated temperature for one hour before determination of palladium dispersion.

TABLES 3A, 3B and 3C show the adverse effect of increasing acidification on the dispersion of the platinum group metal catalytic component on the activated alumina particles.

Referring now to the sole FIGURE of the drawings, there is shown a block flow diagram illustrating one embodiment of a process for preparing a catalyst composition in accordance with the present invention. Activated alumina powder as received from the manufacturer is introduced via line 10 together with distilled water introduced via line 12 into a ballmill 14 in which a first stage of size reduction of the particles of the alumina powder is carried out. Note that the aqueous slurry of alumina powder is not acidified and essentially comprises only the distilled water and the alumina powder. Within ballmill 14, size reduction is carried out to as small a particle size as is feasible without inducing gel formation. The aqueous slurry of size-reduced alumina powder is then transferred via line 16 to a second stage ballmill 22 and an aqueous solution of rhodium chloride from storage tank 20 is introduced into line 16 via line 18. The rhodium chloride acidifies the aqueous slurry of alumina particles sufficiently to prevent gel formation and to permit a second stage of size reduction to be carried out within second stage ballmill 22. Upon completion of the second stage of size reduction, the rhodium chloride impregnated, reduced size activated alumina slurry is transported via line 24 to a mixing tank 40 wherein it will be admixed with other slurries to form a finished slurry of the catalytic material.

Activated alumina powder as received from the manufacturer is introduced via line 26, together with distilled water introduced via line 28 into another first stage ballmill 30 for size reduction. As in ballmill 14, the slurry contains essentially only the alumina powder and distilled water with no acid being present (Obviously, a single first stage ballmill could replace ballmills 14 and 30 but separate ballmills are shown for simplicity of illustration.) Size reduction of the alumina powder is carried out within ballmill 30 to the extent feasible without encountering gel formation and the resultant slurry of size-reduced alumina particles is transferred via line 32 to second stage ballmill 38. An aqueous solution of chloroplatinic acid from storage tank 36 is introduced via line 34a into line 32 to impregnate the activated alumina particles and acidify the slurry. The thus acidified and platinum metal component-impregnated slurry is ballmilled in ballmill 38 in a second stage of size reduction of the activated alumina particles. Upon completion of the second stage of size reduction, the slurry is transferred by line 39 into mixing tank 40. The size of the particle reduced in the second stage ballmills 22 and 38 may be, for example, a size range of 90% by weight of the alumina particles being less than 15 microns in diameter.

Bulk cerium oxide particles are introduced via line 42, together with distilled water introduced via line 44 into another first stage ballmill 46 for a first stage of size reduction, for example, to a size range in which 90% by weight of the ceria particles are less than about 15 microns in diameter. The cerium oxide particles may optionally be, as indicated in the FIGURE, aluminum-stabilized particles of the type described in detail in Commonly Owned and copending U.S. patent application Ser. No 880,270 filed concurrently with this application. These aluminum-stabilized ceria particles are ballmilled to a desired size range in first stage ballmill 46 and transferred via line 48 to mixing tank 40. An aqueous solution of chloroplatinic acid is introduced from storage tank 36 via line 34b into line 48 in order to impregnate the ceria particles which, typically, have surface area, on the order of about 20 m²/g to about 200 m²g.

The three batches of particles comprising rhodium impregnated alumina, platinum impregated alumina and platinum impregnated ceria, are admixed in mixing tank 40 to provide a slurry of the catalytic material of the invention.

The slurry is transferred, as needed, from mixing tank 40 via line 50 to a substrate coating zone 52 wherein suitable monolithic honeycomb carriers, for example, cordierite carriers having 400 gas flow passages per square inch of face area, are dipped into the well agitated slurry in order to coat the fine gas flow passages of the monolith with the slurry. As known in the art, certain techniques may be employed to insure that all or substantially all of the parallel, fine, gas flow passages are filled with the slurry. Excess slurry is removed from the monoliths, such as by blowing compressed air through the fine gas flow passages, to leave behind a thin coating of the slurry on the walls of the gas flow passages. The slurry coated substrates are then transferred by any suitable transport means, represented by the arrow 54, to a pre-dry zone 56. The pre-dried, slurry coated monoliths are then transferred by suitable transport means represented by the arrow 58 to a drying zone 60 in which the slurry coated monoliths are dried, usually by being heated to an elevated temperature on the order of 100° C. or so to remove water from the coating of slurry and dry the same. After drying, the dried, coated monoliths are transported by suitable transport means represented by the arrow 62 to a calcining zone 64 in which the coated monoliths are heated in air at a still further elevated temperature, although preferably not in excess of about 600° C., more preferably not in excess of about 500° C., still more preferably not in excess of about 450° C., say not in excess of about 350° C., to calcine the coating. Such calcination has the effect of forming a hard adherent coating of the catalytic material on the substrate and helps to fix the catalytic metal component, for example, by decomposing the catalytic metal compound to a water insoluble form. Obviously, instead of transporting the coated monoliths from a drying to a calcining zone, the same furnace may be used for drying and calcining by merely elevating the temperature after an initial drying period.

The calcined, catalytic material-coated monoliths are then transported by suitable transport means represented by the arrow 66 to a suitable stabilizer impregnation zone 68 in which the calcined, catalytic material-coated monoliths are dipped into a liquid solution of a suitable thermal stabilizer precursor. For example, this is represented in the flow chart by the passage, from storage tank 72 via line 70, of an aqueous solution of any suitable promoter or stabilizer or their precursor compounds, and the introduction of this solution into stabilizer impregnation zone 68. In practice, the coated monoliths may be submerged within an aqueous solution of the stabilizer or precursor compounds and thoroughly soaked therein. Excess stabilizer solution is allowed to drain from the soaked monoliths back into the tank of solution and the monoliths are then transported by suitable transport means represented by the arrow 74 to a drying zone 76, wherein the thermal stabilizer precursor-impregnated monoliths are dried, as by heating to a moderately elevated temperature of, say, 100° C. or so. The impregnation and drying step may be repeated one or more times if necessary or desirable to increase the amount of thermal stabilizer precursor in the alumina. However, in practice, with a sufficiently concentrated solution of suitable stabilizer compounds, a single such treatment will usually suffice. After the requisite amount of stabilizer precursor is impregnated into the calcined coating, the monoliths are transported by suitable transport means represented in the drawing by arrow 78 to a calcining zone 80 wherein the stabilizer-precursor impregnated monoliths are calcined, preferably at a temperature not in excess of about 500° C. or 600° C., e.g., not in excess of about 350° C., to provide the finished catalyst of the invention.

EXAMPLE 4

A. By following the procedures illustrated in the flow chart of the FIGURE, a 400 cell/in² monolith was coated with a platinum and rhodium-impregnated activated alumina wash-coat and calcined at 350° C. for one hour so as to provide a 30 g/ft³ platinum group metal loading with a 7:1 Pt/Rh ratio. The washcoat contained 28% by weight (of the total weight of washcoat of aluminum-stabilized bulk ceria and 3% by weight (same basis) of BaO, as the thermal stabilizer. This catalyst is designated "A".

B. A commercially available Pt/Rh on activated alumina monolith catalyst of similar composition to that indicated above, including the same platinum group metal loading, was obtained and designated "B". The washcoat of this catalyst "C₄" contained 24% by weight (of the total weight of washcoat) of bulk ceria which was not stabilized by aluminum, and was prepared by a conventional method in which 0.8% by weight (of the total weight of washcoat) of BaO stabilized alumina bearing platinum group metals was ball-milled in a liquid milling agent comprising an aqueous solution of acetic acid, mixed with the bulk ceria, and then coated onto a monolith.

Each of the catalyst monolith bodies A and B having a volume of 42.4 in³ was fitted into one of two identical mounting canisters and mounted in one branch of a split exhaust stream of a laboratory test automobile engine. Each catalyst A and B was aged in the engine exhaust for a period of 100 hours at a stoichiometric air-to-fuel ration ("A/F") set point. The catalysts were constantly exposed to an inlet temperature of about 800° C. During aging, CO and $O_2$ were intermittently introduced into the exhaust stream to provide 3 seconds of a 5% CO "spike" and subsequent 3 seconds of an 8% $O_2$ spike in the exhaust for every 60 seconds of operation. In this way, a catalyst temperature of about 1000° C. was obtained. Commercial unleaded gasoline fuel was used in the engine during the aging.

After aging, the two catalysts A and B were evaluated on an engine dynamometer wherein the air-to-fuel ratio (A/F) employed was fluctuated ±0.5 A/F units at 1.0 Hz perturbations, an A/F of 14.65 being taken as the stoichiometric set point. The evaluation was performed at an inlet temperature of 482° C. and an exhaust gas flow rate of 80,000 volumes (at standard pressure and temperature) of gas per superficial (geometric) volume of catalyst per hour. (By superficial geometric volume is meant the volume of the entire catalyst structure including the voids provided by the gas flow passages, and not just the volume of catalytic material on the monolith.) The catalytic efficiencies of catalysts A and B at the above-described conditions is summarized in TABLE 4.

By reference to TABLE 4, it is immediately apparent that the catalyst A prepared by the method of the present invention provided durable performance in three-way conversion (TWC) use which is superior as compared to the catalyst B prepared by a conventional method.

TABLE 4

Conversion Efficiency of Engine Aged Monolithic Catalysts
% Conversion at A/F Shown

| A/F Catalyst | 14.45 HC | 14.45 CO | 14.45 NO$_x$ | 14.55 HC | 14.55 CO | 14.55 NO$_x$ | 14.64 HC | 14.64 CO | 14.64 NO$_x$ | 14.75 HC | 14.75 CO | 14.75 NO$_x$ | 14.85 HC | 14.85 CO | 14.85 NO$_x$ |
|---|---|---|---|---|---|---|---|---|---|---|---|---|---|---|---|
| A | 66 | 35 | 78 | 72 | 42 | 72 | 77 | 49 | 66 | 80 | 53 | 61 | 82 | 55 | 60 |
| B | 57 | 26 | 65 | 65 | 34 | 61 | 70 | 40 | 56 | 74 | 42 | 53 | 77 | 46 | 52 |

While the invention has been described in detail with respect to specific preferred embodiments thereof, it will be apparent to those skilled in the art upon a reading of the foregoing that numerous variations may be made thereto without departing from the scope of the invention or the appended claims.

What is claimed is:

1. A method of making a catalyst composition comprising a platinum group metal catalytic component and an activated alumina stabilized against thermal degradation, the method comprising:
   (a) applying a coating of activated alumina to a carrier substrate;
   (b) calcining the resultant alumina-coated substrate to provide a calcined coating of activated alumina thereon;
   (c) dispersing one or more platinum group metal components on the activated alumina;
   (d) after step (c), dispersing a stabilizer-precursor onto the calcining coating on the carrier; and
   (e) calcining the coating having the stabilizer-precursor dispersed thereon.

2. The method of claim 1 including dispersing the stabilizer-precursor onto the calcined coating in step (d) by impregnating the calcined coating with an aqueous solution of a stabilizer-precursor.

3. A method of making a catalyst composition comprising a platinum group metal catalytic component and an activated alumina stabilized against thermal degradation, the method comprising:
   (a) dispersing one or more platinum group metal catalytic components on an activated alumina;
   (b) combining a solid, particulate ceria with the activated alumina to form an alumina-ceria mixture;
   (c) applying a coating of the alumina-ceria mixture to a carrier substrate;
   (d) calcining the substrate coated with the alumina-ceria mixture to provide thereon an activated alumina-containing calcined coating;
   (e) after step (d), impregnating the calcined coating on the carrier with a solution of a stabilizer-precursor which upon calcination yields a stabilizer chosen from the group consisting of rare earth metal oxides, alkaline earth metal oxides, titania, zirconia, hafnia, silicon dioxide and mixtures thereof; and
   (f) calcining the stabilizer-precursor impregnated coating.

4. The method of claim 3 including combining said one or more platinum group metal components with the alumina prior to applying the alumina-ceria mixture to the carrier substrate in step (c).

5. The method of claim 4 wherein said one or more platinum group catalytic compounds comprise at least one rhodium compound and at least one compound of a platinum group metal other than rhodium and wherein said compound of a platinum group metal other than rhodium is combined with the ceria prior to applying the alumina-ceria mixture to the carrier substrate in step (c).

6. The method of any one of claims 1, 2, 3, 4, and 5 wherein the calcining steps are carried out at a temperature of not more than about 600° C.

7. The method of claim 6 wherein the calcining steps are carried out at a temperature of not more than about 500° C.

8. The method of claim 6 wherein the calcining steps are carried out at a temperature of not more than about 350° C.

9. The method of claim 6 wherein the calcining steps are carried out in air.

10. The method of claim 8 wherein the calcining steps are carried out in air.

11. The method of any one of claims 1, 2, 3, 4 and 5 wherein the activated alumina which is impregnated with the stabilizer-precursor is an unstabilized activated alumina.

12. The method of any one of claims 1, 2, 3, 4 and 5 including the step of, subsequent to the first calcination but prior to the second, impregnating the calcined coating with an aqueous solution of a stabilizer-precursor selected from the group consisting of one or more of alkaline earth metal oxide precursors, silicon dioxide precursors, rare earth metal oxide precursors and Group IVB metal oxide precursors.

13. The method of claim 12 wherein the stabilizer-precursor comprises a barium compound and a lanthanum compound.

14. The method of any one of claims 1, 2, 3, 4 or 5 wherein said one or more platinum group metal catalytic component comprises a platinum component.

15. The method of any one of claims 1, 2, 3, 4 or 5 wherein said one or more platinum group metal catalytic components comprises a palladium component.

16. The method of any one of claims 1, 2, 3, 4 or 5 wherein said one or more platinum group metal catalytic components comprise a platinum component and a palladium component.

17. The method of any one of claims 1, 2, 3, 4 or 5 wherein said one or more platinum group metal catalytic components comprise a palladium component and a rhodium component.

18. The method of any one of claims 1, 2, 3, 4 or 5 wherein said one or more platinum group metal catalytic components comprise a palladium component and a rhodium component.

19. The method of claim 1 or claim 2 including combining said one or more platinum group metal catalytic components with the activated alumina prior to applying catalytic metal components and activated alumina to the carrier substrate.

20. The method of claim 19 including combining the platinum group metal catalytic components with the activated alumina by contacting the activated alumina with one or more solutions comprising a liquid and one or more compounds of the metals of the platinum group metal catalytic components, said compounds being soluble in said liquid.

21. The method of claim 3 wherein the solid, particulate ceria comprises an aluminum-stabilized ceria.

22. The method of claim 21 wherein the aluminum-stabilized ceria contains from about 0.05 to about 10 weight percent of aluminum, measured as $Al_2O_3$, based on the total weight of the aluminum-stabilized ceria.

23. The method of claim 3 or claim 22 wherein rare earth metal oxide constituents other then $CeO_2$ are also applied to the substrate, the ceria comprising at least 90 weight percent, measured as $CeO_2$, of the total rare earth metal oxide constituents applied.

24. The method of claim 3 or claim 22 wherein rare earth metal oxide constituents other than $CeO_2$ are also applied to the substrate, the ceria comprising at least 95 weight percent, measured as $CeO_2$, of total rare earth metal oxide constituents applied.

25. The method of claim 3 or claim 22 wherein rare earth metal oxide constituents other that $CeO_2$ are also applied to the substrate, the ceria comprising at least 99 weight percent, measured as $CeO_2$, or the total rare earth metal oxide constituents applied.

26. The method of any one of claims 1, 2, 3, 4 and 5, including limiting the exposure of the alumina to acid so that platinum and rhodium catalytic components, when one or both are present, each has a dispersion of at least about 0.3 carbon monoxide molecules per atom of platinum group metal as measured by CO chemisorption after reduction in hydrogen at 750° C. for one hour.

27. The method of any one of claims 1, 2, 3, 4 and 5, including limiting acidification conditions to which the alumina is exposed so that platinum and rhodium catalytic components, when one or both are present, each has a dispersion of at least about 0.4 carbon monoxide molecules per atom of platinum group metal as measured by CO chemisorption after reduction in hydrogen at 750° C. for one hour.

28. A method of making a catalyst composition comprising an activated alumina having one or more platinum group metal catalytic components dispersed thereon, comprising:
(a) dispersing one or more platinum group metal catalytic components on particles of an activated alumina;
(b) applying to a carrier substrate the activated alumina having said one or more platinum group metal catalytic components thereon, and calcining the resultant coating on the carrier substrate; and
(c) carrying out steps (a) and (b) while limiting the exposure of the activated alumina to acid so that platinum, rhodium and palladium catalytic components, when one or more are present, each has a dispersion of at least about 0.3 carbon monoxide molecules per atom of platinum group metal as measured by CO chemisorption (i) the disperson of platinum and rhodium being measured after reduction in hydrogen at 750° C. for one hour and (ii) the dispersion of palladium being measured after heating in air for one hour at 750° C. followed by reduction in hydrogen at 350° C. for one hour.

29. The method of claim 28 wherein the platinum, rhodium and palladium catalytic components, when one or more are present, each has a dispersion of at least about 0.4 carbon monoxide molecules per atom of platinum group metal as measured by CO chemisorption.

30. The method of claim 28 or claim 29 including dispersing said one or more platinum group metal catalytic components on the activated alumina by contacting the activated alumina with one or more liquids containing dispersions therein of compounds of the metals of said platinum group metal catalytic components said liquids being capable of being removed by volatilization or decomposition upon application of heat and/or vacuum.

31. The method of claim 30 wherein the one or more liquids comprise one or more aqueous solutions of compounds of the metals of the platinum group metal catalytic components.

32. The method of any one of claims 28, 29, 30 or 31 including modifying the activated alumina by incorporating therein a modifier selected from the group consisting of one or more of alkaline earth metal oxide, rare earth metal oxides, silicon dioxide, Group IVB metal oxides, chromium oxide, iron oxide, nickel oxide and precursors thereof.

33. The method of claim 28 or claim 29 wherein the calcining is carried out at a temperature not in excess of about 600° C.

34. The method of claim 28 or claim 29 wherein the calcining is carried out at a temperature not in excess of about 500° C.

35. The method of claim 28 or claim 29 wherein the calcining is carried out at a temperature not in excess of about 350° C.

36. The method of any one of claims 33, 34 or 35 wherein the calcining is carried out in air.

37. The method of claim 28 including applying to the carrier substrate particles of a solid, particulate ceria along with the particles of activated alumina.

38. The method of claim 37 wherein the solid, particulate ceria comprises aluminum-stabilized ceria.

39. The method of claim 37 or claim 38 wherein the ceria comprises at least 90 weight percent ceria, measured as $CeO_2$, and exclusive of the aluminum stabilizer content.

40. The method of claim 37 or claim 38 wherein the ceria comprises at least 95 weight percent ceria, measured as $CeO_2$, and exclusive of the aluminum stabilizer content.

41. The method of claim 37 or claim 38 wherein the ceria comprises at least 99 weight percent ceria, measured as $CeO_2$, and exclusive of the aluminum stabilizer content.

42. The method of claim 28 or claim 29 including in a preliminary step, milling a slurry of particles of the activated alumina in a non-acidified milling liquid to reduce the size of the particles in a first stage size reduction step.

43. The method of claim 42 wherein the milling liquid comprises water.

44. The method of claim 42 including carrying out a second stage size reduction step comprising milling the particles of activated alumina obtained from the first step in an acidified milling liquid.

45. The method of claim 44 wherein the acidified milling liquid is an aqueous solution of a compound of a metal of said platinum group metal catalytic components.

46. A catalyst prepared by a process comprising the steps of: providing a carrier substrate; applying and dispersing upon said carrier substrate particles of an activated alumina having one or more platinum group metal catalytic components dispersed thereon, calcining said alumina and dispersed catalytic components subsequent to their application to said carrier substrate to provide a calcined coating on the carrier substrate, and subsequently stabilizing said calcined coating by (a) impregnating the calcined coating with a solution of a stabilizer-precursor, and (b) calcining the stabilizer-precursor impregnated coating.

47. The catalyst of claim 46 wherein the solution of a stabilizer-precursor is an aqueous solution containing a stabilizer-precursor selected from the group consisting of one or more of alkaline earth metal oxide precursors, rare earth metal oxide precursors, and Group IVB metal oxide precursors.

48. The catalyst of claim 47 wherein the Group IVB metal is zirconium.

49. The catalyst of claim 47 wherein the stabilizer-precursor comprises a mixture of a barium compound and a lanthanum compound.

50. The catalyst of any one of claims 46, 47, 48 or 49 wherein said one or more platinum group metal catalytic components comprises a platinum component.

51. The catalyst of any one of claims 46, 47, 48 or 49 wherein said one or more platinum group metal catalytic components comprises a palladium component.

52. The catalyst of any one of claims 46, 47, 48 or 49 wherein said one or more platinum group metal catalytic components comprise a platinum component and a palladium component.

53. The catalyst of any one of claims 46, 47, 48 or 49 wherein said one or more platinum group metal catalytic components comprise a palladium component and a rhodium component.

54. The catalyst of any one of claims 46, 47, 48 or 49 wherein said one or more platinum group metal catalytic components comprise a platinum component and a rhodium component.

55. The catalyst of claim 46 or claim 47 wherein the calcined coating is modified by being thermally stabilized and the solution of a modifier precursor is a solution of a thermal stabilizer precursor.

56. The catalyst of claim 46 or claim 47 including a solid, particulate ceria.

57. The catalyst of claim 56 including a solid, particulate aluminum-stabilized ceria.

58. The catalytic of claim 57 wherein the aluminum-stabilized ceria contains from about 0.05 to about 10 weight percent of aluminum, measured as $Al_2O_3$, based on the total weight of the aluminum-stabilized ceria.

* * * * *